United States Patent
Jain et al.

(10) Patent No.: US 10,358,143 B2
(45) Date of Patent: Jul. 23, 2019

(54) ABERRANT DRIVER CLASSIFICATION AND REPORTING

(71) Applicant: Ford Global Technologies, LLC, Dearborn, MI (US)

(72) Inventors: Jinesh J Jain, San Mateo, CA (US); Daniel Levine, San Mateo, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 886 days.

(21) Appl. No.: 14/842,666

(22) Filed: Sep. 1, 2015

(65) Prior Publication Data
US 2017/0057521 A1    Mar. 2, 2017

(51) Int. Cl.
| B60W 50/14 | (2012.01) |
| G06N 20/00 | (2019.01) |
| G06F 16/28 | (2019.01) |

(52) U.S. Cl.
CPC .......... B60W 50/14 (2013.01); G06F 16/285 (2019.01); G06N 20/00 (2019.01); B60W 2420/42 (2013.01); B60W 2420/52 (2013.01)

(58) Field of Classification Search
CPC ............ B60W 50/14; B60W 2420/42; B60W 2420/52; B60W 40/09; G06F 17/30598; G06N 99/005; G07C 5/008; H04W 4/046; H04L 67/12; G08G 1/166
See application file for complete search history.

(56) References Cited

U.S. PATENT DOCUMENTS

| 7,710,249 | B2 | 5/2010 | Park | |
| 8,554,468 | B1 | 10/2013 | Bullock | |
| 8,977,747 | B2 | 3/2015 | Tonnesen | |
| 9,147,353 | B1* | 9/2015 | Slusar | G09B 19/167 |
| 9,524,269 | B1* | 12/2016 | Brinkmann | G06F 17/00 |
| 9,623,876 | B1* | 4/2017 | Slusar | G09B 19/167 |
| 2012/0083960 | A1* | 4/2012 | Zhu | G06T 7/223 701/23 |
| 2013/0024060 | A1* | 1/2013 | Sukkarie | G01C 21/26 701/22 |
| 2013/0079964 | A1* | 3/2013 | Sukkarie | G01C 21/3469 701/22 |
| 2014/0195106 | A1* | 7/2014 | McQuade | G07C 5/0841 701/33.9 |
| 2014/0195310 | A1* | 7/2014 | McQuade | G06Q 10/06393 705/7.39 |
| 2014/0236414 | A1 | 8/2014 | Droz | |

(Continued)

FOREIGN PATENT DOCUMENTS

| CN | 104598892 A | 5/2015 |
| JP | 2004206207 A | 7/2004 |
| JP | 2008296682 A | 12/2008 |

*Primary Examiner* — Orlando Bousono
(74) *Attorney, Agent, or Firm* — David R. Stevens; Stevens Law Group

(57) ABSTRACT

Methods, devices and apparatuses pertaining to aberrant driver classification and reporting are described. A method may involve receiving a message from a user of a first vehicle, the message indicating an instance of aberrant driving of a second vehicle. The method may also involve determining that the instance has occurred using one or more classifiers. The method may further involve collecting information of the second vehicle and generating a warning message based on the information.

10 Claims, 6 Drawing Sheets

(56) References Cited

U.S. PATENT DOCUMENTS

| | | | | |
|---|---|---|---|---|
| 2014/0266655 A1* | 9/2014 | Palan | G06K 9/00805 | 340/435 |
| 2014/0267263 A1* | 9/2014 | Beckwith | G06T 15/08 | 345/424 |
| 2014/0306814 A1* | 10/2014 | Ricci | H04W 4/21 | 340/425.5 |
| 2014/0306834 A1* | 10/2014 | Ricci | B60Q 1/00 | 340/902 |
| 2014/0306835 A1* | 10/2014 | Ricci | H04W 4/21 | 340/902 |
| 2014/0308902 A1* | 10/2014 | Ricci | H04W 4/21 | 455/66.1 |
| 2014/0309838 A1* | 10/2014 | Ricci | H04W 4/21 | 701/25 |
| 2014/0309849 A1* | 10/2014 | Ricci | B60Q 1/00 | 701/33.4 |
| 2014/0309919 A1* | 10/2014 | Ricci | H04W 4/21 | 701/301 |
| 2014/0309930 A1* | 10/2014 | Ricci | H04W 4/21 | 701/431 |
| 2014/0310379 A1* | 10/2014 | Ricci | H04W 4/21 | 709/217 |
| 2014/0310702 A1* | 10/2014 | Ricci | H04W 4/21 | 717/173 |
| 2014/0354684 A1* | 12/2014 | Beckwith | G06F 3/011 | 345/633 |
| 2015/0061895 A1* | 3/2015 | Ricci | H04W 4/90 | 340/902 |
| 2015/0145995 A1* | 5/2015 | Shahraray | H04W 4/70 | 348/148 |
| 2015/0161893 A1* | 6/2015 | Duncan | G07C 5/008 | 701/1 |
| 2015/0193885 A1* | 7/2015 | Akiva | G06Q 40/08 | 705/4 |
| 2015/0232065 A1* | 8/2015 | Ricci | B60R 25/01 | 701/36 |
| 2015/0246654 A1* | 9/2015 | Tadic | B60W 40/09 | 340/436 |
| 2015/0266455 A1* | 9/2015 | Wilson | G09B 19/10 | 701/93 |
| 2015/0294422 A1* | 10/2015 | Carver | G06Q 40/08 | 705/4 |
| 2015/0317847 A1* | 11/2015 | Prakah-Asante | G07C 5/08 | 701/1 |
| 2016/0026182 A1* | 1/2016 | Boroditsky | H04L 67/306 | 701/23 |
| 2016/0039426 A1* | 2/2016 | Ricci | H04W 4/21 | 701/1 |
| 2016/0040998 A1* | 2/2016 | Ricci | H04W 4/21 | 701/431 |
| 2016/0041820 A1* | 2/2016 | Ricci | H04W 4/21 | 717/172 |
| 2016/0133130 A1* | 5/2016 | Grimm | H04L 67/22 | 340/905 |
| 2016/0267335 A1* | 9/2016 | Hampiholi | G06F 3/013 | |

\* cited by examiner

ABERRANT DRIVER CLASSIFICATION AND REPORTING

TECHNICAL FIELD

The present disclosure generally relates to traffic safety and, more particularly, to methods and systems for aberrant driver classification and reporting.

BACKGROUND

Aberrant drivers are a danger to nearby pedestrians, drivers and themselves. The category of aberrant driving typically includes variously defined categories of reckless driving, careless driving, improper driving, erratic driving, and driving without due care and attention. Thus, there is a need for a solution for recognizing and mitigating the impact of aberrant driving in order to reduce motor vehicle accidents and fatalities caused by aberrant drivers.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Implementations herein use unsupervised and/or semi-supervised learning to build and grow a set of features of aberrant driving behaviors. These features may be processed to build one or more classifiers. The one or more classifiers may then be deployed or otherwise transmitted to a number of vehicles to be used to identify or characterize one or more aberrant driving behaviors of one or more other vehicles in the vicinity of a vehicle. A user, e.g., a driver or a passenger, of the vehicle may report one or more perceived aberrant driving behaviors upon observing driving behavior(s) of one or more other vehicles that the user perceives to be aberrant driving behavior(s). If a perceived aberrant driving behavior is confirmed to be an aberrant driving behavior according to the one or more classifiers, a warning message may be generated and transmitted to other vehicles in vicinity of the vehicle.

Figure 1:
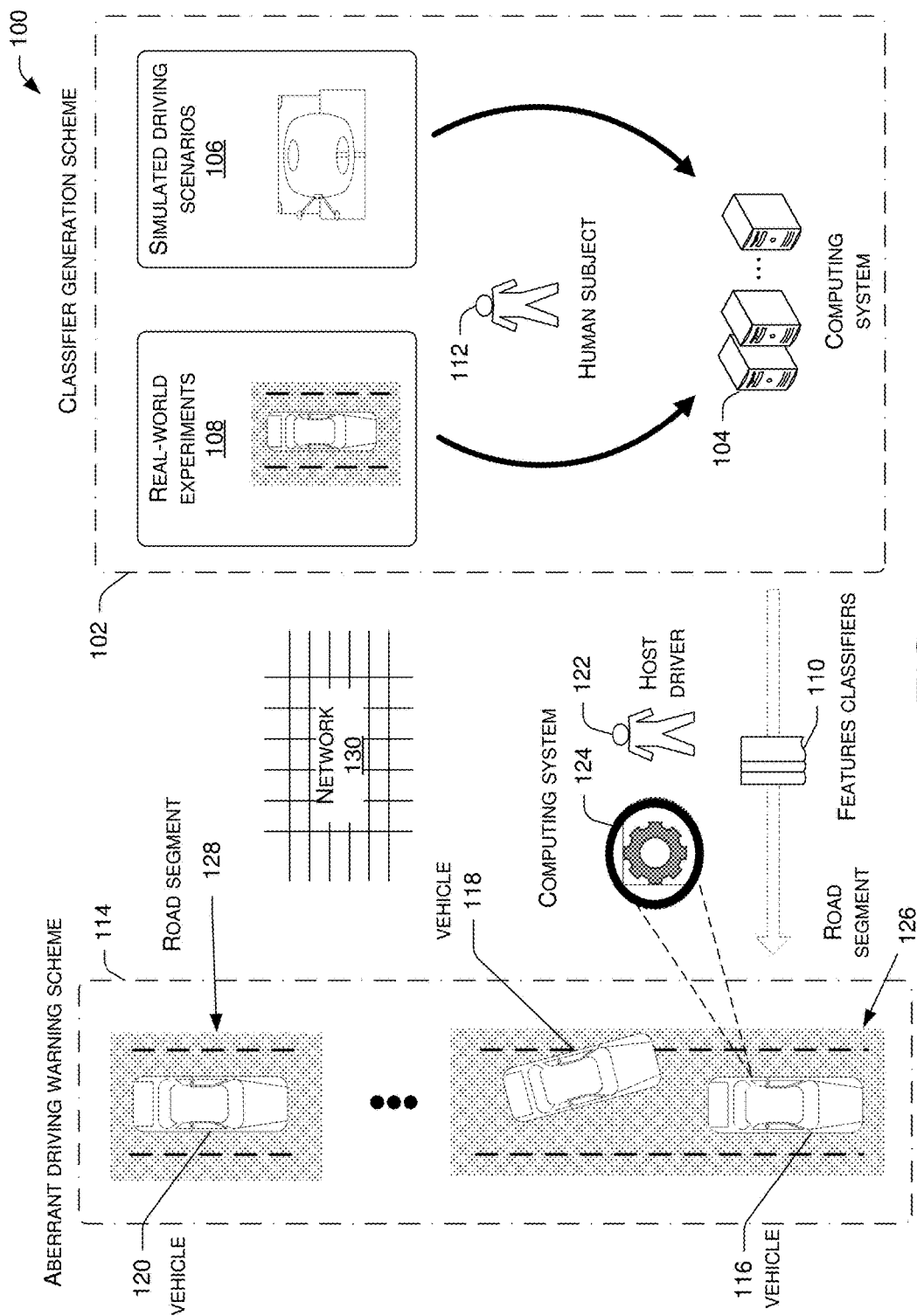
FIG. 1 is a diagram depicting an example environment in which example embodiments of the present disclosure may be implemented.

FIG. 1 is a diagram depicting an example environment 100 in which example embodiments of the present disclosure may be implemented. Example environment 100 may include a classifier generation scheme 102 for the generation of classifiers for identifying and/or characterizing aberrant driving behaviors. Classifier generation scheme 102 includes a computing system 104. Computing system 104 may include a computing apparatus, such as a server, or a collection of servers in a distributed configuration (e.g., a cloud computing service, a server farm, etc.) or a non-distributed configuration.

In accordance with various embodiments of the present disclosure, computing system 104, in a basic configuration, may include various modules, each discussed below. Computing system 104 may collect data by way of a combination of simulations and real-world experiments, such as one or more simulated driving scenarios 106 and one or more real-world experiments 108.

In some implementations, in the one or more simulated driving scenarios 106, computing system 104 may simulate one or more aberrant driving behaviors in a driving simulator. Alternatively, computing system installed on the driving simulator may collect data and transmit the data to computing system 104 to build and/or train the one or more feature classifiers 110.

In the one or more simulated driving scenarios 106, a human subject or a user 112 may be subjected to a range of driving scenarios involving potential aberrant driving behaviors. For example, a steering wheel instrumented with push buttons may be used by user 112 to signal whether user 112 perceives a currently simulated situation as involving a potentially dangerous or aberrant driving behavior. For example, a pushed button may flag a window of time in which another vehicle in the vicinity of the vehicle that user 112 is simulated to be driving may have exhibited one or more aberrant driving behaviors. In some implementations, a monitor of a heart rate, a breath rate and/or a degree of perspiration may be placed on user 112 to measure auxiliary signals that may indicate unease of user 112 (e.g., an increase in the heart rate, breath rate and/or degree of perspiration) under one or more simulated driving scenarios 106.

In some implementations, in one or more real-world experiments 108, a portion of computing system 104 may be installed on a vehicle driven by user 112. Alternatively, another computing system installed on the vehicle may collect data and transmit the data to computing system 104 to build and/or train the one or more feature classifiers 110. For example, user 112 may drive a vehicle on a road, and the vehicle may be equipped with one or more sensors (e.g., one or more two-dimensional (2D) cameras, a Light Detection and Ranging (LIDAR) or a Radio Detection and Ranging (RADAR) system) to provide estimate data of other vehicles in the vicinity of the vehicle driven by user 112. In some implementations, the vehicle driven by user 112 may receive a signal from user 112 when user 112 perceives another vehicle in the vicinity to be exhibiting one or more aberrant driving behaviors. Moreover, the vehicle driven by user 112 may collect data on driving behaviors of other vehicles in the vicinity using the one or more sensors within a certain window of time. In these instances, repeating patterns of one or more aberrant driving behaviors may be procedurally re-simulated to reduce uncertainty and further train the one or more feature classifiers 110.

Example environment 100 may further include an aberrant driving warning scheme 114 for uses of the one or more classifiers to identify and/or characterize one or more aberrant driving behaviors. Aberrant driving warning scheme 114 may include a number of vehicles including, for example, a vehicle 116, a vehicle 118 and a vehicle 120. The one or more feature classifiers 110 may be deployed or otherwise transmitted to any one of these vehicles. For example, the one or more feature classifiers 110 may be transmitted to vehicle 116. A user 122, e.g., a driver or a passenger of vehicle 116, may report one or more perceived aberrant driving behaviors of vehicle 118 to computing system 104, e.g., via network 130. In these instances, user 122 may use an operation (e.g., depressing a button) similar to that described above when user 122 perceives one or more aberrant driving behaviors of vehicle 118 on a road segment 126.

In some implementations, vehicle 116 may also be equipped with one or more sensors to allow a computing system 124 of vehicle 116 to collect data on one or more other vehicles in the vicinity of vehicle 116 (e.g., vehicle 118). Using the one or more feature classifiers 110, computing system 124 may assign a weight, or risk parameter, attributed to the report (e.g., a warning message) based on a classification of the vehicle in concern, e.g., vehicle 118. In some implementations, the risk parameter may be modified (e.g., having its value increased or decreased) based on the prevalence of other reports on that same vehicle. For instance, in a situation where a malicious user spams computing system 104 with a plethora of false reports on a given vehicle, computing system 104 may decrease the value of the risk parameter attributed to the reports from the malicious user. In some implementations, the risk parameter may be a function of evaluation of and generated by one or more feature classifiers 110, and may indicate an agreement between the evaluation of one or more feature classifiers 110 and evaluation of user 122. In some implementations, the risk parameter may also include a measure designed to filter out false reporting from malicious user(s). This measure may avoid false reports with unacceptable frequency. In some implementations, the value of the risk parameter may be incrementally decreased by computing system 104 over a period of time so that after the passage of a predetermined amount of time the risk parameter may be zero. This way, a driver of a reported vehicle may not be labeled as an aberrant driver permanently, especially when an instance of aberrant driving by such driver may be a rare, one-time occasion and not reflective of a normal driving behavior of such driver.

The warning message may be transmitted to vehicle 120 on a road segment 128 via network 130. For instance, vehicle 116 may transmit the warning message to vehicle 120 when vehicle 120 satisfies a user-definable metric such as, for example, being sufficiently close to vehicle 116 (e.g., within a close proximity such as 30 feet, 50 feet or 100 feet). Road segment 128 may be within any user-definable metric (e.g., a predetermined range) of road segment 126, e.g., 100 feet, 200 feet or any user-definable distance. Network 130 may include wired and/or wireless networks that enable communications between the various computing devices described in example environment 100. In some embodiments, network 130 may include local area networks (LANs), wide area networks (WAN), mobile telephone networks (MTNs), and other types of networks, possibly used in conjunction with one another, to facilitate communication between the various computing devices.

In some implementations, user 122 and a driver of vehicle 120 may be in a drive safety network. For example, the driver of vehicle 120 may be warned or otherwise made aware that vehicle 118 has exhibited one or more aberrant driving behaviors and may be approaching vehicle 120, upon a determination by computing system 124 and/or user 122 of an instance of one or more aberrant driving behaviors exhibited by vehicle 118. The driver of vehicle 120 may also determine that vehicle 118 exhibits the same or different one or more aberrant driving behaviors. The drive safety network may assign and/or aggregate a risk parameter to vehicle 118 in response to receiving a warning message regarding vehicle 118. When a value of the risk parameter associated with vehicle 118 exceeds a risk threshold, the drive safety network may automatically report the one or more aberrant driving behaviors exhibited by vehicle 118 to a local authority.

Figure 2:
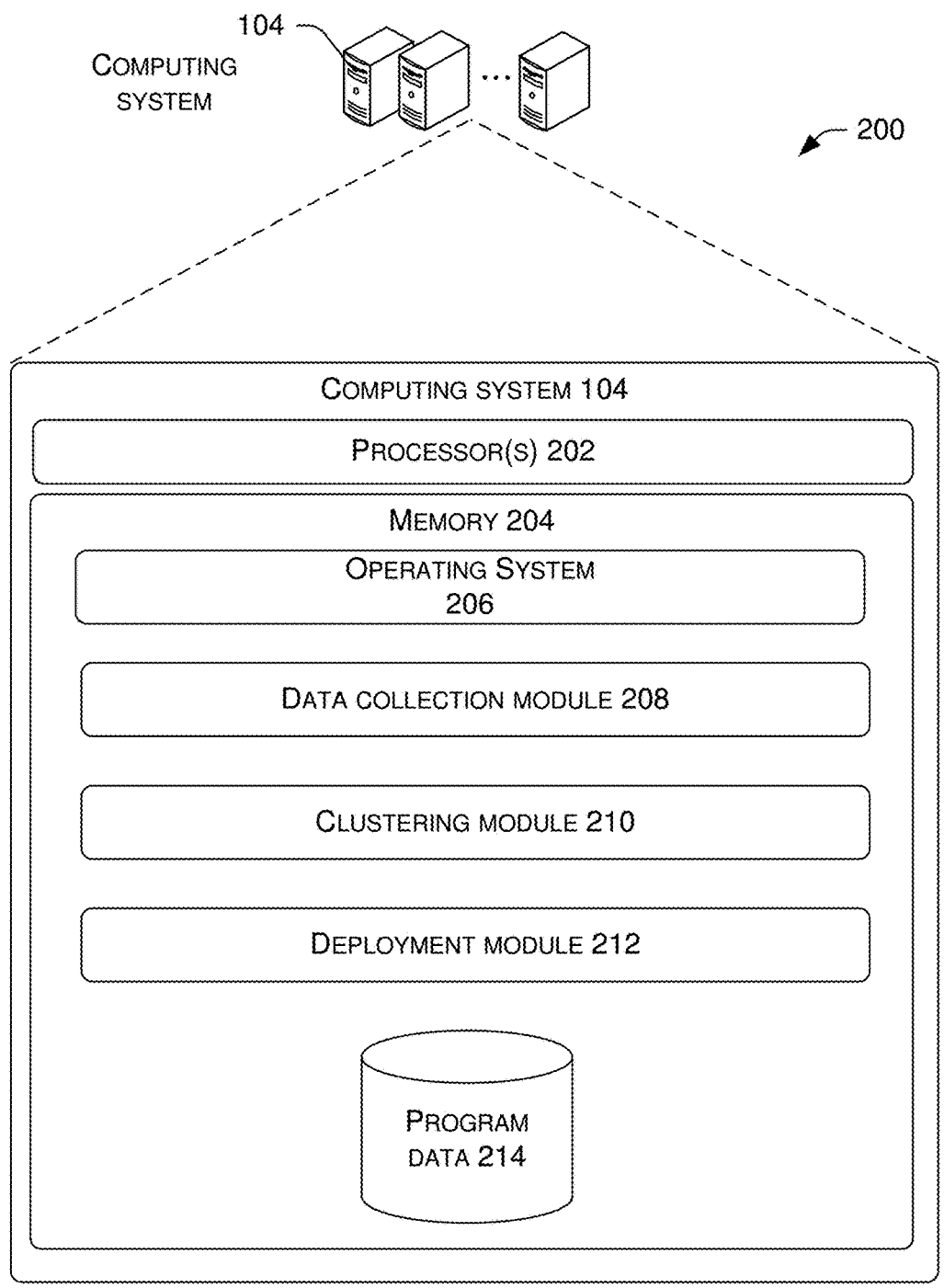
FIG. 2 is a block diagram depicting an example computing architecture in accordance with an embodiment of the present disclosure.

FIG. 2 is a block diagram depicting an example computing architecture 200 in accordance with an embodiment of the present disclosure. Computing architecture 200 may be an example implementation of computing system 104, which may be in the form of a computing apparatus having modules, kernels, data, and/or hardware.

Computing system 104 may include one or more processors 202 and memory 204. Memory 204 may store various modules, applications, programs, or other data. Memory 204 may include one or more sets of instructions that, when executed by the one or more processors 202, cause the one or more processors 202 to perform the operations described herein for computing system 104. The one or more processors 202 may include one or more graphics processing units (GPU) and one or more central processing units (CPU).

Computing system 104 may have additional features and/or functionalities. For example, computing system 104 may also include additional data storage devices (removable and/or non-removable) including computer-readable media. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, program data, or other data. The system memory, the removable storage and the non-removable storage are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other medium that can be used to store the desired information and which can be accessed by computing system 104. Any such computer storage media may be part of computing system 104. Moreover, the computer-readable media may include computer-executable instructions that, when executed by the processor(s), perform various functions and/or operations described herein.

Memory 204 may store an operating system 206 as well as various modules including, for example, a data collection module 208, a clustering module 210, a transmission module 212, and program data 214. Operating system 206 may include one or more sets of instructions that are executable by one or more processors 202 to control operations of computing system 104.

Data collection module 208 may be configured to present driving scenarios involving aberrant driving behaviors to user 112, and receive data indicative of one or more responses of user 112 regarding the driving scenarios. Data collected by data collection module 208 may be stored as program data 214.

In some implementations, computing system 104 may simulate the driving scenarios involving the aberrant driving behaviors using a simulation system. For example, user 112 may be situated or otherwise placed into the simulation system, and one or more responses of user 112 may be monitored. The one or more responses of user 112 may include signals each of which indicating an aberrant driving behavior perceived by user 112 in response to a simulated condition. In some implementations, the one or more responses may include an auxiliary signal associated with one or more physical parameters of user 112.

In some implementations, computing system 104 may facilitate real-world experiments to user 112. Computing system 104 may monitor one or more responses of user 112. The one or more responses may include signals each of which indicating an aberrant driving behavior perceived by user 112 in response to a driving condition. Computing system 104 may collect real-time data including state estimates that are generated by one or more sensors of a testing vehicle and within a predetermined window of time after receiving the signals from user 122.

Clustering module 210 may be configured to cluster the data, collected by data collection module 208, using a nonparametric technique to generate the one or more feature classifiers 110. For example, a set of features may include rules of road infractions such as failure to signal a turn, failure to stop at an appropriate signal, proceeding without right of way, crossing a solid lane boundary or into oncoming traffic and grossly exceeding the speed limit (e.g., by more than 10 mph). Another set of features may relate to specific absolute and relative profiles that observed vehicles may exhibit. This set of features may include, for example, swerving, skidding, oscillating laterally, deviation from a lane center for more than a threshold amount of time, lane changing without proper clearance, erratic speed control, erratic braking, and off-nominal confluence with a traffic flow.

Figure 3:
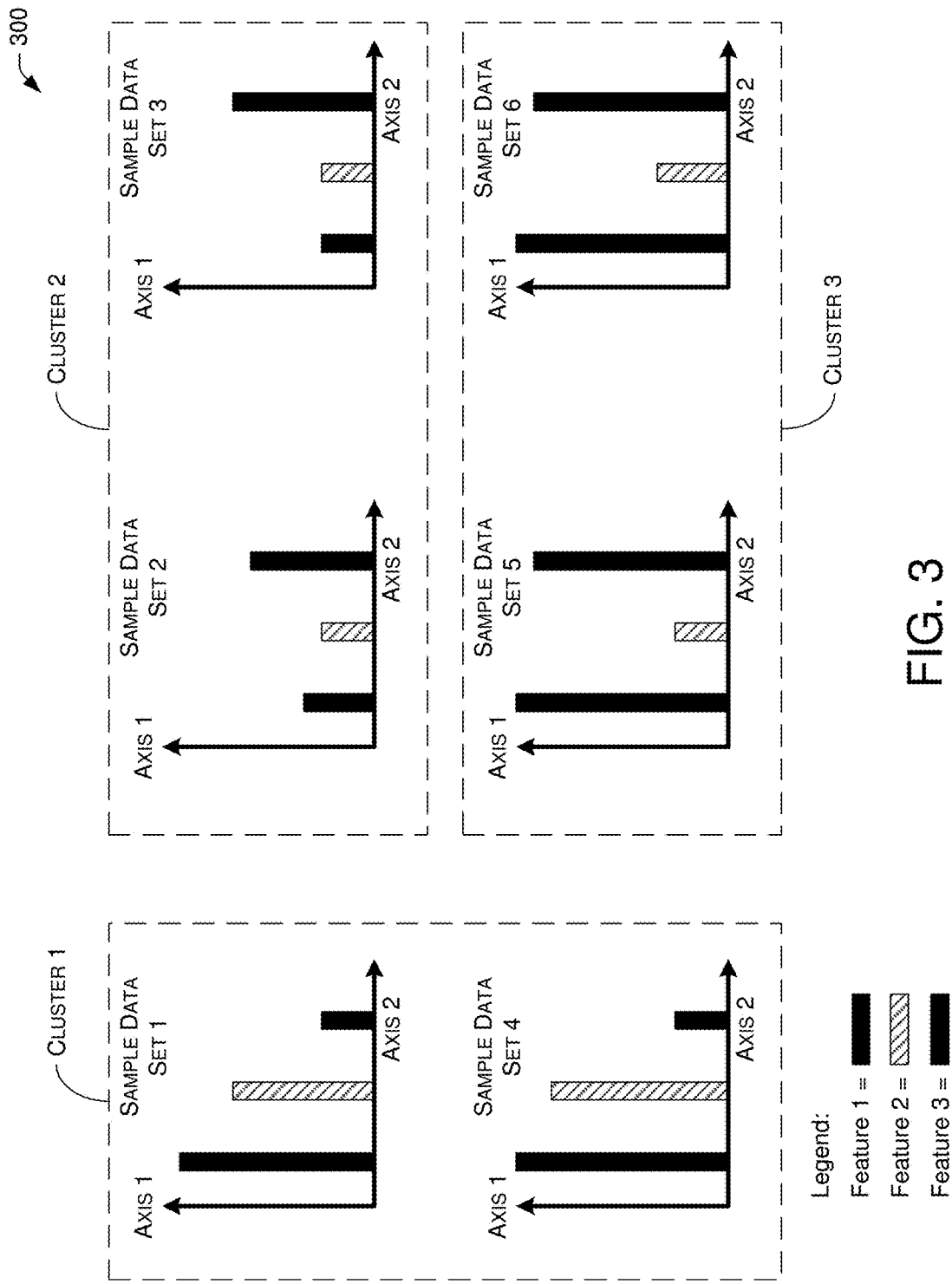
FIG. 3 is a diagram of a simplified example of data clustering in accordance with the present disclosure.

FIG. 3 illustrates a simplified example 300 of data clustering in accordance with the present disclosure. In the simplified example 300 shown in FIG. 3, there are data associated with three features being clustered. The three features (e.g., feature 1, feature 2 and feature 3) may pertain to, for example, (1) the speed of a vehicle, (2) an amount of deviation from the center line of a lane in which the vehicle is traveling, and (3) whether a blinker is turned on when the vehicle makes a turn. Data for each of these features may be a series of continuous numbers (e.g., speed of the vehicle and/or deviation from the center line of the lane) or discrete numbers (e.g., 0 or 1 indicative of whether the blinker is off or on when the vehicle is turning). In the simplified example 300 shown in FIG. 3, there are six sets of unique sample data for each of the three features, and these six sets of unique sample data are grouped into three clusters (e.g., cluster 1, cluster 2 and cluster 3) each having two sets of the unique sample data. In some implementations of the present disclosure, a number of features (e.g., feature 1, feature 2 and feature 3) may be utilized for feature engineering to collect a number of sets of sample data for clustering by any suitable algorithm, e.g., executed by clustering module 210. The result of the data clustering may be used to train classifiers such as the one or more feature classifiers 110.

Examples of an algorithm for data clustering may include, for example and not limited to, deep learning based techniques, k-means clustering, and hierarchical clustering.

Transmission module 212 may be configured to transmit the one or more feature classifiers 110 to one or more vehicles, e.g., vehicle 116. Accordingly, user 122 of vehicle 116 may report one or more perceived aberrant driving behaviors of vehicle 118 (and/or any other vehicle), and the report may be transmitted from vehicle 116 to one or more other vehicles, e.g., vehicle 120. For example, if one or more perceived aberrant driving behaviors of vehicle 118 are confirmed according to the one or more feature classifiers 110, the report may be generated and transmitted to vehicle 120, which may be in the vicinity of vehicle 116 and/or vehicle 118.

Figure 4:
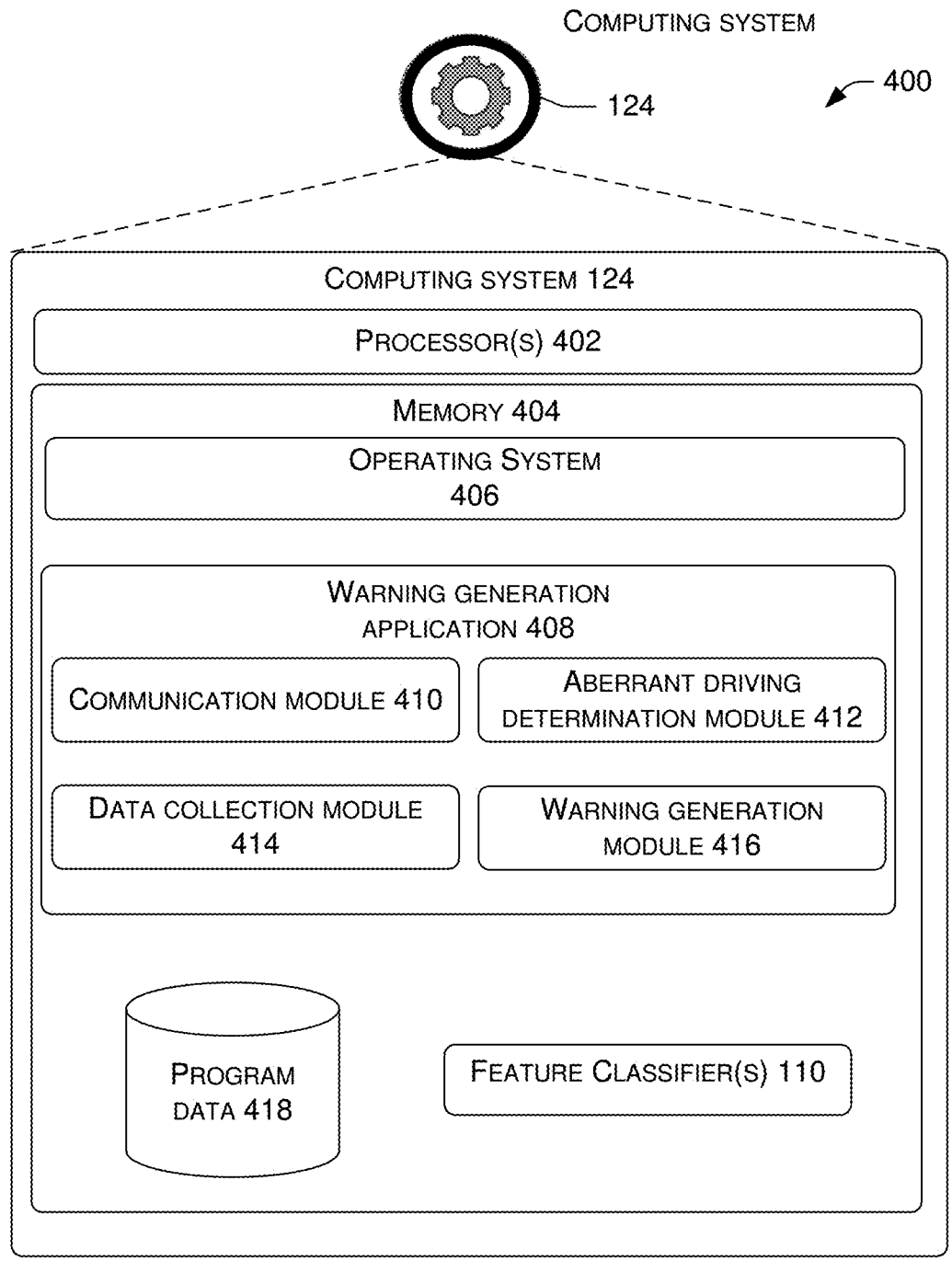
FIG. 4 is a block diagram depicting an example computing architecture in accordance with another embodiment of the present disclosure.

FIG. 4 is a block diagram depicting an example computing architecture 400 in accordance with an embodiment of the present disclosure. Computing architecture 400 may be an example implementation of computing system 124, which may be in the form of a computing apparatus having modules, kernels, data, and/or hardware.

Computing system 124 may include one or more processors 402 and memory 404. Memory 404 may store various modules, applications, programs, or other data. Memory 404 may include one or more sets of instructions that, when executed by the one or more processors 402, cause the one or more processors 402 to perform the operations described herein for computing system 124. The one or more processors 402 may include one or more graphics processing units (GPU) and one or more central processing units (CPU).

Computing system 124 may have additional features and/or functionalities. For example, computing system 124 may also include additional data storage devices (removable and/or non-removable) including computer-readable media. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, program data, or other data. The system memory, the removable storage and the non-removable storage are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other medium that can be used to store the desired information and which can be accessed by computing system 124. Any such computer storage media may be part of computing system 124. Moreover, the computer-readable media may include computer-executable instructions that, when executed by the processor(s), perform various functions and/or operations described herein.

Memory 404 may store an operating system 406 as well as various modules including, for example, a warning generation application 408, one or more feature classifiers 110 and program data 418. Warning generation application 408 may further include various modules such as, for example, a communication module 410, an aberrant driving determination module 412, a data collection module 414 and a warning generation module 416. Operating system 406 may include one or more sets of instructions that are executable by one or more processors 402 to control operations of computing system 124.

Communication module 410 may be configured to receive a message from user 122 of vehicle 116. The message may indicate an instance of an aberrant driving behavior of another vehicle, e.g., vehicle 118, as perceived by user 122.

Aberrant driving determination module 412 may be configured to determine whether the instance of an aberrant driving behavior has occurred using the one or more feature classifiers 110, which may have been trained using driving scenario simulations and/or real-world experiments.

In some implementations, the one or more feature classifiers 110 may include template motion plans which may include, for example and not limited to, aberrant driving features and/or aberrant driving profiles. In these instances, the aberrant driving features are associated with driving behaviors including, for example and not limited to, at least one of the following: failure to signal a turn, failure to stop at an appropriate signal, proceeding without right of way, crossing a solid lane boundary, driving into oncoming traffics, exceeding a speed limit, tailgating and honking excessively. The aberrant driving profiles may include, for example and not limited to, at least one of swerving, skidding, oscillating laterally, prolonged deviation from a lane center, lane changing without proper clearance, erratic speed control, erratic braking, or off-nominal confluence with a traffic flow, any erratic and/or hostile and dangerous driving behaviors.

In some implementations, aberrant driving determination module 412 may determine a parameter using the aberrant driving classifiers. The parameter may indicate possibility that the instance of aberrant driving behavior has occurred within a predetermined window of time after receiving the message from user 122. Aberrant driving determination module 412 may further determine that the instance has occurred if the value of the parameter is greater than a predetermined threshold value.

Data collection module 414 may be configured to collect information of vehicle 118, which exhibits aberrant driving behaviors in this example. For instance, vehicle 116 may be equipped with one or more sensors (e.g., vision device(s), a LIDAR system or a RADAR system) to provide estimated data of vehicle 118 such as speed, acceleration, direction and/or any information regarding the behavior of vehicle 118. Data collected by data collection module 414 may be stored as program data 418.

Warning generation module 416 may be configured to generate a warning message based on the data collected by data collection module 414. For example, the warning message may include an encoded license plate number and/or a description of vehicle 118. Communication module 410 may transmit the warning message to one or more other vehicles, e.g., vehicle 120, which may satisfy a user-defined metric with respect to the one or more other vehicles (e.g., when vehicle 120 is in a predetermined range of vehicle 116 such as 50 feet, 100 feet or 200 feet).

In some implementations, warning generation application 408 may receive a new warning message indicating another instance of aberrant driving behavior of vehicle 118. The other instance may have occurred prior to the instance perceived by user 122. In some implementations, warning generation application 408 may calculate a risk parameter of vehicle 118 based on the new warning message and the warning message previously received, and then provide information of vehicle 118 to computing system 104, which may determine whether or not to report to an authority. For instance, warning generation application 408 may generate and transmit a report to computing system 104, which may determine whether or not to provide the report to an authority, e.g., Department of Motor Vehicles, regarding the aberrant driving behaviors of vehicle 118.

Figure 5:
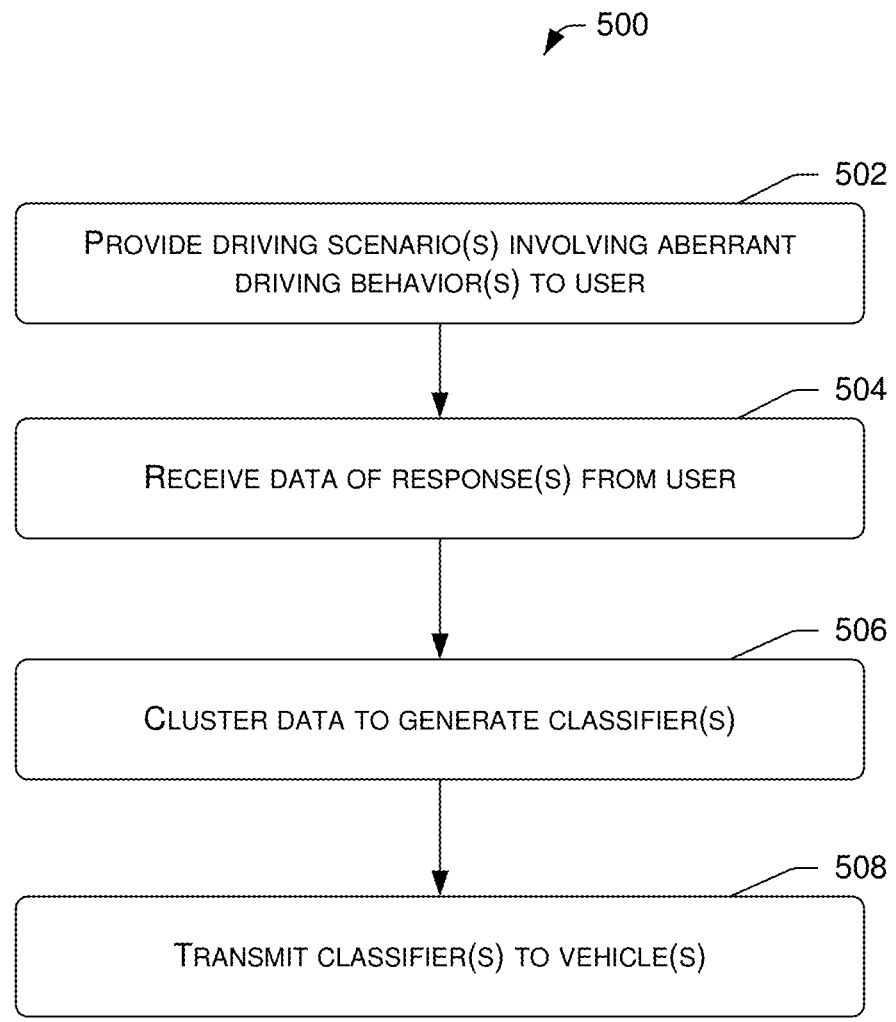
FIG. 5 is a flowchart of an example process in accordance with an embodiment of the present disclosure.

FIG. 5 illustrates an example process 500 implementing an embodiment in accordance with the present disclosure. Example process 500 may correspond to one of various implementation scenarios based on example environment 100, and is provided solely for illustrative purpose so that those skilled in the art may better appreciate benefits and advantages provided by the present disclosure. Therefore, the scope of the present disclosure is not limited by example process 500. For illustration purpose and not limiting the scope of the present disclosure, the description of example process 500 is provided below in the context of implementation using one or more processors 202 of computing system 104. Example process 500 may begin at 502.

At 502, one or more processors 202 may provide one or more driving scenarios involving one or more aberrant driving behaviors to user 112. In some implementations, one or more processors 202 may provide one or more simulations of the one or more driving scenarios involving the one or more aberrant driving behaviors through a simulation system. In other implementations, computing system 104 may facilitate real-world experiments to which user 112 is subjected. Example process 500 may proceed from 502 to 504.

At 504, one or more processors 202 may receive data indicative of a response of user 112 to the one or more driving scenarios. In some implementations, the one or more responses may include signals each of which indicating a response to an aberrant driving behavior from user 112 under a simulated condition. In some implementations, one or more processors 202 may monitor user 112 to collect data of the one or more responses and the one or more driving scenarios. The data of one or more responses may include, for example, a measurement of one or more auxiliary signals associated with one or more physical parameters (e.g., a heart rate, a breath rate and/or a degree of perspiration) of user 112. Example process 500 may proceed from 504 to 506.

At 506, one or more processors 202 may cluster the data of one or more responses of user 112 to generate one or more feature classifier 110. The one or more feature classifiers 110 may include, for example, one or more template motion plans or one or more actions associated with one or more aberrant driving features or one or more aberrant driving profiles. In some implementations, the one or more aberrant driving features are associated with one or more driving behaviors including at least one of the following: failure to signal a turn, failure to stop at an appropriate signal, proceeding without right of way, crossing a solid lane boundary, driving into oncoming traffics and exceeding a speed limit. The one or more aberrant driving profiles may include, for example, at least one of the following: swerving, skidding, oscillating laterally, deviation from a lane center for more than a threshold period of time (e.g., 5 seconds, 10 seconds, 15 seconds, 30 seconds or a user-definable duration), lane changing without proper clearance, erratic speed control, erratic braking and off-nominal confluence with a traffic flow. Example process 500 may proceed from 506 to 508.

At 508, one or more processors 202 may transmit the one or more feature classifiers 110 to one or more vehicles including vehicle 116. Using the one or more feature classifiers 110, user 122 may report one or more perceived aberrant driving behaviors of vehicle 118. If a perceived aberrant driving behaviors is confirmed according to the one or more feature classifiers 110, a warning message may be generated and transmitted to vehicle 120, which is in the vicinity of vehicle 118 and/or vehicle 116.

In some implementations, the one or more classifiers may include one or more classifiers trained using either or both of a simulation driving scenarios and real-world experiments. Additionally or alternatively, the one or more classifiers may include one or more template motion plans, one or more actions associated with one or more aberrant driving features, one or more aberrant driving profiles, or a combination thereof. In some implementations, the one or more aberrant driving features may be associated with driving behaviors that include at least one of failure to signal a turn, failure to stop at an appropriate signal, proceeding without right of way, crossing a solid lane boundary, driving into oncoming traffic, or exceeding a speed limit. In some implementations, the one or more aberrant driving profiles may include at least one of swerving, skidding, oscillating laterally, deviation from a lane center for more than a threshold period of time, lane changing without proper clearance, erratic speed control, erratic braking, or off-nominal confluence with a traffic flow.

In some implementations, example process 500 may further involve transmitting the warning message to at least a third vehicle that satisfies a user-defined metric with respect to the first vehicle.

In some implementations, example process 500 may further involve a number of operations, including: receiving an additional warning message indicating an additional instance of aberrant driving of the second vehicle, the additional instance occurring prior to the instance; calculating a risk parameter of the second vehicle based on the additional warning message and the warning message; and generating a report regarding the aberrant driving of the second vehicle. In some implementations, the additional warning message may include the information of the second vehicle and one or more warning messages regarding the second vehicle.

In some implementations, in determining that the instance has occurred using the one or more classifiers, example process 500 may perform a number of operations, including: determining a parameter using the one or more classifiers, the parameter indicating a possibility that the instance of aberrant driving occurs within a predetermined window of time after receiving the message; and determining that the instance occurs in an event that the parameter is greater than a predetermined value.

In some implementations, the warning message may include an encoded license plate number of the second vehicle, a description of the second vehicle, or a combination thereof.

Figure 6:
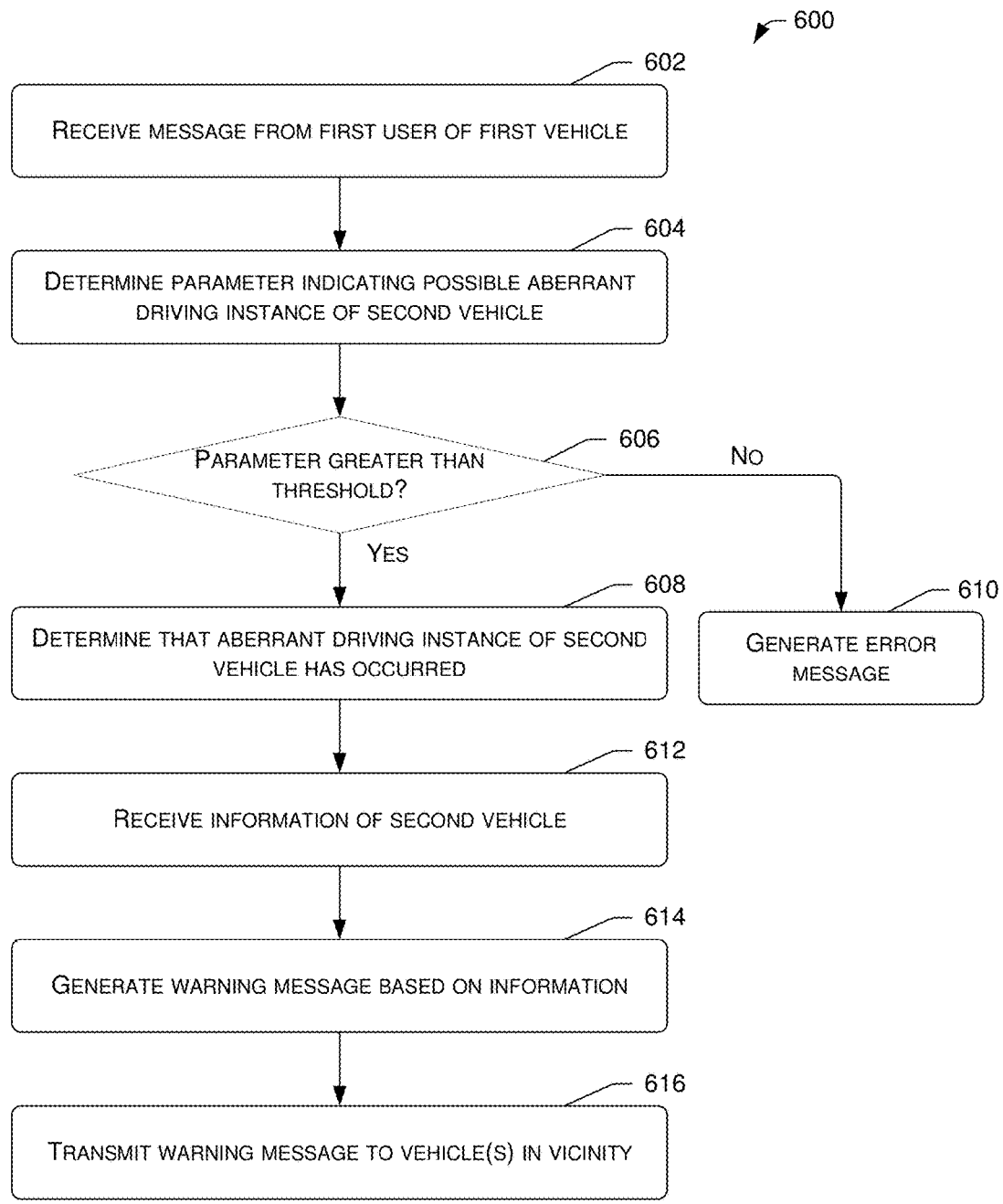
FIG. 6 is a flowchart of an example process in accordance with another embodiment of the present disclosure.

FIG. 6 illustrates an example process 600 implementing an embodiment in accordance with the present disclosure. Example process 600 may correspond to one of various implementation scenarios based on example environment 100, and is provided solely for illustrative purpose so that those skilled in the art may better appreciate benefits and advantages provided by the present disclosure. Therefore, the scope of the present disclosure is not limited by example process 600. For illustration purpose and not limiting the scope of the present disclosure, the description of example process 600 is provided below in the context of implementation using one or more processors 402 of computing system 124. Example process 600 may begin at 602.

At 602, one or more processors 402 may receive a message from user 122 of vehicle 116, e.g., a driver or a passenger sitting in vehicle 116. The message may indicate an instance of aberrant driving of vehicle 118. Example process 600 may proceed from 602 to 604.

At 604, one or more processors 402 may determine a parameter indicating a possibility that the instance of aberrant driving has occurred within a predetermined window of time after receiving the message from user 122. In some implementations, one or more processors 402 may determine the parameter using the one or more feature classifiers 110. Example process 600 may proceed from 604 to 606.

At 606, one or more processors 402 may determine whether the value of the parameter is greater than a threshold value. In an event that it is determined that the value of the parameter is greater than the threshold value (corresponding to the "YES" branch out of operation 606), example process 600 may proceed to 608. In an event that it is determined that the value of the parameter is less than or equal to the threshold value (corresponding to the "NO" branch out of operation 606), example process 600 may proceed to 610.

At 608, one or more processors 402 may determine that the instance of aberrant driving has occurred. Example process 600 may proceed from 608 to 612.

At 610, one or more processors 402 may generate an error massage and provide the message to user 122.

At 612, one or more processors 402 may receive information of vehicle 118. The information of vehicle 118 may be collected or obtained using one or more sensors installed on vehicle 116 (e.g., vision device(s), camera(s), a LIDAR system or a RADAR system) to provide to one or more processors 402 estimated data of vehicles in the vicinity, including vehicle 120.

At 614, one or more processors 402 may generate a warning message based on the received information of vehicle 118. For example, the warning message may include an encoded license plate number or a description of vehicle 118.

At 616, one or more processors 402 may transmit the warning message to vehicle 120. For example, user 122 and the driver of vehicle 120 may belong to a network, which facilitates message sharing within the network.

In some implementations, in providing the one or more driving scenarios, example process 600 may involve providing one or more simulations of the one or more driving scenarios through a simulation system.

In some implementations, in receiving the data indicative of a response of the user to the one or more driving scenarios, example process 600 may involve receiving a measurement of one or more physical parameters of the user as a response to the one or more aberrant driving behaviors under a simulated condition.

In some implementations, in the one or more classifiers may include one or more template motion plans or one or more actions associated with one or more aberrant driving features. Moreover, the one or more aberrant driving features may be associated with one or more driving behaviors that include at least one of failure to signal a turn, failure to stop at an appropriate signal, proceeding without right of way, crossing a solid lane boundary, driving into oncoming traffic, or exceeding a speed limit.

In some implementations, in the one or more classifiers may include one or more template motion plans or one or more actions associated with one or more aberrant driving profiles. Additionally, the one or more aberrant driving profiles may include at least one of swerving, skidding, oscillating laterally, deviation from a lane center for more than a threshold period of time, lane changing without proper clearance, erratic speed control, erratic braking, or off-nominal confluence with a traffic flow.

The articles "a" and "an" are used herein to refer to one or to more than one (i.e., to at least one) of the grammatical object of the article. By way of example, "a user" means one user or more than one users. Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code or the like), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Although the present disclosure is described in terms of certain embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method, comprising:
receiving, by one or more processors, a message from a user of a first vehicle, the message indicating an instance of aberrant driving of a second vehicle;
determining, by the one or more processors, that the instance has occurred using one or more classifiers;
receiving, by the one or more processors from one or more sensors of the first vehicle, information of the second vehicle obtained by the one or more sensors; and
generating, by the one or more processors, a warning message that identifies the second vehicle based on the information received from the one or more sensors,
wherein the determining that the instance has occurred using the one or more classifiers comprises:
determining a risk parameter using the one or more classifiers, the risk parameter indicating a possibility that the instance of aberrant driving occurs within a predetermined window of time after receiving the message;
determining that the instance occurs in an event that the risk parameter is greater than a predetermined value; and
incrementally decreasing a value of the risk parameter over a period of time such that, after passage of a predetermined amount of time, the value of the risk parameter is zero.

2. The method of claim 1, wherein the one or more classifiers comprise one or more classifiers trained using either or both of a simulation driving scenarios and real-world experiments.

3. The method of claim 1, wherein the one or more classifiers comprise one or more template motion plans, one or more actions associated with one or more aberrant driving features, one or more aberrant driving profiles, or a combination thereof.

4. The method of claim 3, wherein the one or more aberrant driving features are associated with driving behaviors comprising at least one of failure to signal a turn, failure to stop at an appropriate signal, proceeding without right of way, crossing a solid lane boundary, driving into oncoming traffic, or exceeding a speed limit.

5. The method of claim 3, wherein the one or more aberrant driving profiles comprise at least one of swerving, skidding, oscillating laterally, deviation from a lane center for more than a threshold period of time, lane changing without proper clearance, erratic speed control, erratic braking, or off-nominal confluence with a traffic flow.

6. The method of claim 1, further comprising:
transmitting the warning message to at least a third vehicle that satisfies a user-defined metric with respect to the first vehicle.

7. The method of claim 1, further comprising:
receiving an additional warning message indicating an additional instance of aberrant driving of the second vehicle, the additional instance occurring prior to the instance;
calculating the risk parameter of the second vehicle based on the additional warning message and the warning message; and
generating a report regarding the aberrant driving of the second vehicle.

8. The method of claim 7, further comprising:
transmitting the report to an authority.

9. The method of claim 7, wherein the additional warning message comprises the information of the second vehicle and one or more warning messages regarding the second vehicle.

10. The method of claim 1, wherein the warning message comprises an encoded license plate number of the second vehicle, a description of the second vehicle, or a combination thereof.

* * * * *